United States Patent [19]

Goetz

[11] 3,960,390
[45] June 1, 1976

[54] INFLATOR

[75] Inventor: George W. Goetz, Detroit, Mich.

[73] Assignee: Eaton Corporation, Cleveland, Ohio

[22] Filed: Apr. 17, 1974

[21] Appl. No.: 461,663

[52] U.S. Cl. .............................. 280/731; 280/87 R
[51] Int. Cl.² .......................................... B60R 21/08
[58] Field of Search .................... 280/150 AB, 87 R; 222/3, 5; 23/281; 102/39

[56] References Cited
UNITED STATES PATENTS

| | | | |
|---|---|---|---|
| 2,993,217 | 7/1961 | Switlik | 9/316 |
| 3,608,834 | 9/1971 | MacLaren | 137/516.17 |
| 3,663,036 | 5/1972 | Johnson | 222/5 |
| 3,773,352 | 11/1973 | Radke | 280/150 AB |
| 3,774,807 | 11/1973 | Keathley | 222/5 |
| 3,788,667 | 1/1974 | Vancil | 280/150 AB |
| 3,797,853 | 3/1974 | Grosch et al. | 280/150 AB |
| 3,799,573 | 3/1974 | McDonald | 280/150 AB |
| 3,827,715 | 8/1974 | Lynch | 280/150 AB |
| 3,831,973 | 8/1974 | Meacham | 280/87 R |
| 3,836,169 | 9/1974 | Schiesterl | 280/150 AB |
| 3,871,684 | 3/1975 | Staudacher et al. | 280/150 AB |

Primary Examiner—Kenneth H. Betts
Attorney, Agent, or Firm—Teagno & Toddy

[57] ABSTRACT

An inflator for a vehicle occupant restraint system of the type having an inflatable confinement for restraining the vehicle occupant in the event of a collision. The inflator includes reservoir means containing pressurized fluid and gas generating means disposed within a region encompassed by the reservoir means, and means defining an outlet passage. The fluid outlet of the inflator is covered by a diffuser having a plurality of spaced peripheral exit ports, the diffuser having an initially collapsed closed condition and, upon activation of the gas generating means in response to a collision, the diffuser is moved to a deformed open position permitting fluid flow to the diffuser exit ports.

18 Claims, 3 Drawing Figures

INFLATOR

BACKGROUND OF THE INVENTION

Vehicle occupant restraint systems of the type having a confinement expandable from a collapsed nonoperative position to an inflated operative position require a source of inflating fluid which must respond to a collision signal within a short duration of time, typically 50 milliseconds or less. Where it is desired to provide such an occupant restraint for the vehicle driver, it has been found desiable to provide the source of inflating fluid as a compact integral unit within the collapsed confinement. In order to provide crash restraint for the vehicle operator, it has been found desirable to mount the inflatable confinement on the hub of the vehicle steering wheel. In order to provide the compact unit of confinement and inflator in a form low in weight and rotary inertia for steering wheel mounting, it has been found desirable to utilize an inflator having gas generating means for providing a portion of the inflating fluid.

Inflators for vehicle occupant restraints having gas generating means typically utilize ignitable and combustible solid chemical mixtures which require the combustion products thereof to be filtered, trapped and diffused before entry into the confinement for inflation. As mentioned above, it is desirable that the inflator assembly be low in transverse profile for compact mounting on the steering wheel hub, and therefore, a minimum extension in a direction axially of the steering column. Furthermore it is desirable that the exit ports of the diffuser provide reactionless flow from the inflator in the event that the inflator is inadvertently activated during manufacture, shipping or assembly onto the vehicle. Therefore, it has been found desirable to dispose the diffuser exit ports in a circumferentially equally spaced radial-flow arrangement.

Where the inflator for the inflatable confinement is of the hybrid type having reservoir means containing gas generating means in addition to pressurized stored fluid, it has been found convenient and desirable to have the reservoir shaped to an annular configuration for steering wheel mounting with the gas generating means disposed within the central region of the reservoir. One configuration which has been found satisfactory for the combination, or hybrid, inflator is an inflator having an axial outlet passage with respect to the annular reservoir, with the diffuser disposed over the axial outlet passage. However, in such an arrangement, the diffuser adds additional axial length to the inflator causing the assembly to extend an undesirable distance in a direction toward the occupant when the inflator is mounted on the steering wheel. Therefore, it has been desired to provide a diffuser for a steering wheel mounted inflator for an inflatable occupant restraint wherein the inflator assembly including the diffuser, has the lowest possible profile in a direction axially of the steering column.

SUMMARY OF THE INVENTION

The present invention provides a compact, low transverse profile inflator for an inflatable vehicle occupant restraint of the type mounted on the vehicle steering wheel for crash restraint of the vehicle operator. The inflator of the present invention includes a novel diffuser which is disposed over the discharging outlet of the inflator, and the diffuser directs and diffuses the fluid flow radially outwardly from the outlet in a reactionless manner. The inflator of the present invention includes an annular reservoir for stored pressurized gas and augmenting gas generating means disposed centrally of, and in a region encompassed by, the annular reservoir. The novel diffuser has the form of a circular plate formed to a generally cup-shape with exit ports provided around the periphery of the rim of the cup shape. The diffuser member has the outer periphery, or rim, thereof attached to the axial face of the annular reservoir and has an initially closed position with the central portion of the diffuser spaced closely adjacent the outer surface of the annular reservoir. Upon activation of the gas generating means and/or release of fluid from the reservoir to the fluid outlet, the diffuser is moved to a deformed open condition in which fluid flows in a substantially unrestricted manner to the diffuser exit ports. The diffuser of the present invention thus provides inflator assembly having a minimum profile in a direction axially of the vehicle steering wheel when the inflatable confinement is in the collapsed and stored condition.

DETAILED DESCRIPTION

Figure 1:
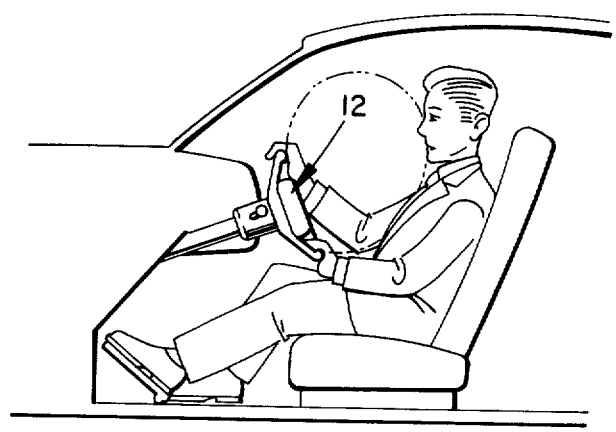
FIG. 1 is a side view of the portion of the vehicle showing the inflator mounted on the vehicle steering wheel.
Figure 2:
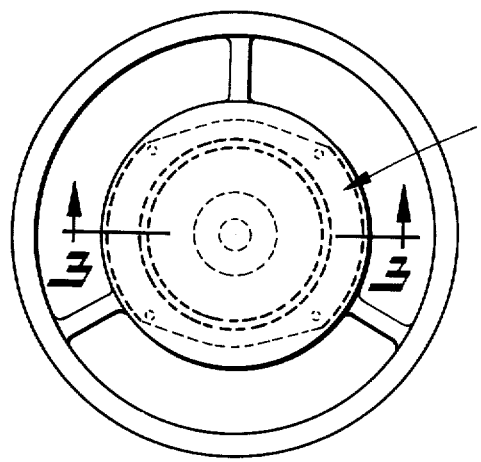
FIG. 2 is a view of the installed inflator assembly as seen from the driver's position.

The vehicle occupant restraint 10 is illustrated in FIGS. 1 and 2 in the installed position on the steering wheel system of the vehicle wherein an inflatable confinement 10 is shown in solid outline in the collapsed condition and in phantom outline in the expanded operative condition. The confinement is disposed over an inflator assembly 12 which is attached to the vehicle steering wheel by any suitable fastening means (not shown) as, for example, bolts or rivets.

Figure 3:
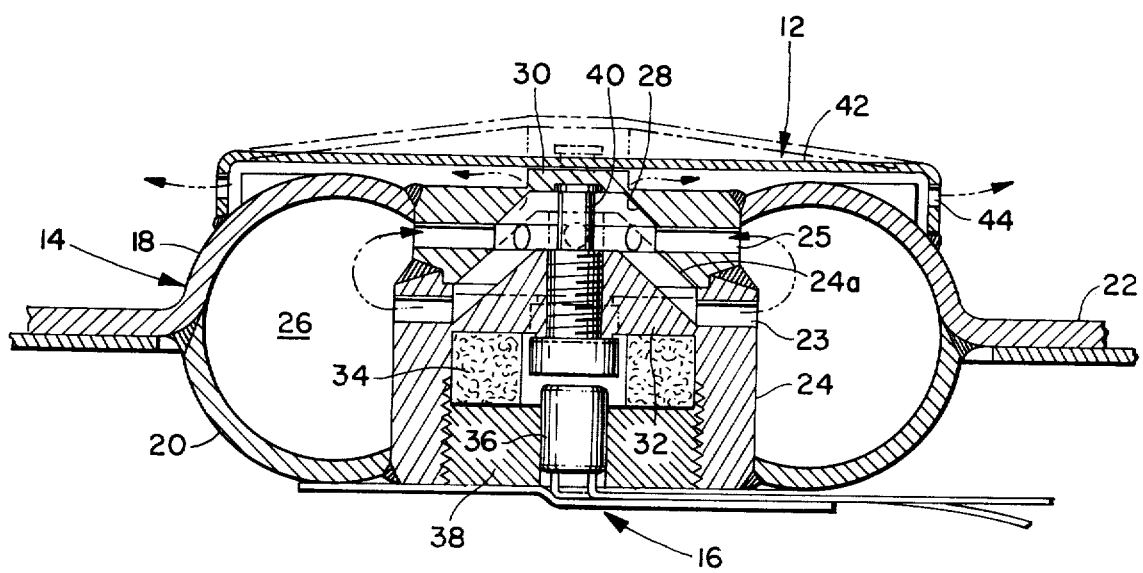
FIG. 3 is a transverse section taken along section indicating lines 3—3 of FIG. 2 showing the collapsed diffuser in solid outline and the expanded diffuser in dashed outline.

Referring now to FIG. 3, the inflator assembly 12 includes reservoir means 14 having gas generating means 16 operatively associated therewith. The reservoir means preferably has an annular configuration with the gas generating means 16 disposed centrally with respect to the annular reservoir. In the preferred practice of the invention the reservoir means is formed of annular half shells 18, 20 joined at the outer periphery thereof as, for example, by welding; and, if desired, the half shells preferably include a mounting flange 22 disposed at the outer periphery thereof. Alternatively, if desired, the mounting flange may be omitted and fastening means (not shown) as, for example, threaded studs, may be attached to one half shell 20 and to extend in a direction generally axially of the reservoir.

The reservoir means has a tubular member 24 disposed in the central region of the annular half shells 22, 20 and the tubular member 24 has the periphery of the ends thereof joined to the inner periphery of the half shells in any convenient fluid pressure sealing manner as, for example, by welding. The region intermediate the outer periphery of the tubular member 24 and the inner periphery of the half shells 20 and 22 thus define an annular chamber for receiving a charge of pressurized fluid. A plurality of radial passages 23 and 25 are provided, through the wall of tubular member 24, at two axially spaced locations, thus communicating the annular chamber 26 with the interior region of the tubular member 24.

The interior region of the tubular member 24 thus defines an exit passage 28 for the annular pressure chamber 26. The exit passage 28 is sealed at one end by a disk 30 having frangible portions provided therein. The opposite end of the tubular member 24 is sealed by a movable member 32 initially having frangible portions thereof integral with the inner periphery of the tubular member 24.

The gas generating means 16 is disposed within the tubular member 24 adjacent the movable member 32 and the generating means 16 includes a ring of solid propellant 34, electrical igniter 36 and a retaining ring 38. In the preferred practice of the invention the propellant ring 34 is assembled into the tubular member 24, the electrical igniter 36 is attached to the retaining ring 38, and the retaining ring 38, secured therein by threaded engagement with the tubular member 24, with the igniter 36 disposed closely adjacent the propellant 34. The retaining ring 38 has an aperture provided therein for the igniter electrical leads to pass therethrough.

The movable member 32 includes a plunger 40 extending toward the disk 30, with the end of the plunger initially disposed in closely spaced arrangement with respect to disk 30. Upon activation of the gas generating means 16, the frangible portions of the movable member 32 are ruptured and the member 32 moves axially within the tubular member 24 toward the frangible disk 30. In operation, movement of the member 32 causes plunger 40 to rupture disk 30 and move the disk 30 axially so as to open exit passage 28. The movable member 32 is shown in FIG. 3 in its ruptured condition in phantom outline, with the disk 30 being also shown in the open position in phantom outline.

A diffuser member 42 is disposed axially over the outlet passage 28 initially in closely spaced collapsed arrangement. In the preferred practice of the invention the diffuser 42 has a generally flat bottomed cup-shaped configuration with a plurality of circumferentially spaced radial exit ports 44 provided around the rim thereof of the cup shape. The closed end or flat bottomed portion of the diffuser 42 is preferably spaced closely adjacent the disk 30 sealing the exit passage 28.

In the preferred practice, the outer rim of the cup-shaped member 42 is attached to the axial face of the reservoir half shell 18 in any convenient manner as, for example, by welding. Thus, in the initial condition with the disk 30 in the sealed condition, as shown in solid line in FIG. 3, the diffuser 42 fits closely adjacent or flush against the axial face of the reservoir 14 and closely adjacent or flush against the disk 30 closing the exit passage 28. Upon activation of the gas generating means, and movement of the plunger 40, which shears disk 30 and drives it against the inner surface of the diffuser 42, the flat bottom in the diffuser 42 is deformed to the generally dome-shaped configuration shown in phantom outline in FIG. 3. Thus, the initially flat portion of diffuser 42 which is spaced closely to, or in contact, with the axial face of the reservoir is now moved away from, the axial face of the reservoir. The opening and axial spacing of the diffuser from the reservoir thus provides a substantially unrestricted annular passageway for the fluid to flow from exit port 28 radially outwardly to the exit ports 44.

The radial passages 23 and 25 provided in the wall of the tubular portion 24 are preferably spaced in two axial stations such that, when the movable member 32 is ruptured, the member 32 moves to a position intermediate the spaced passages 23, 25. The movable member 32 is restrained by a shoulder 24a provided on the inner periphery of the tubular member 24.

With this arrangement of the passages 23 and 25, the hot gases from the burning propellant are directed outwardly through one set of passages 23 into the pressure chamber 26 and then radially inwardly through the remaining set of passages 25 into the exit passage 28. The generated gases are thus caused to admix with the stored gas prior to flow through the diffuser.

Although the inflator of the present invention has been described and illustrated herein as having a deformable diffuser with an initially generally flat configuration on the axial face of the inflator, it will be apparent that other arrangements of the diffuser may be employed. For example, the diffuser may be conformed closely to the outer surface of the reservoir and may also be attached at points intermediate the outer periphery if so desired. The invention thus provides a novel inflator for a vehicle occupant restraint system, the inflator including a diffuser having an initially closed condition and a deformed open condition for permitting desired fluid flow upon activation of the inflator. The initially closed condition of the diffuser thus provides a minimum axial profile to the assembled inflator when same is mounted onto a vehicle steering wheel.

Modifications and variations of the present invention will be apparent to those having ordinary skill in the art, and the invention is limited only by the following claims.

What is claimed is:

1. An inflator for inflating an expandable confinement for restraining a vehicle occupant in response to a collision signal, said inflator comprising:
    a. structure defining a source of pressurized fluid;
    b. means operable upon receipt of said collision signal to activate said fluid source and permit pressurized fluid to flow therefrom;
    c. outlet means for directing said fluid flow from said source including diffuser means having a member formed of generally rigid material with a plurality of exit ports disposed about the periphery thereof for directing fluid flow generally radially therefrom, said member having a central portion of substantially planar configuration with the periphery thereof secured to the structure of said fluid source, said member being deformable in the direction of flow from said fluid source in response to activation of said fluid source from an initial generally flat position substantially restricting fluid flow to a deformed curved open position permitting substantially less restricted fluid flow to said exit ports.

2. The device defined in claim 1, wherein said source of fluid includes gas-generating means.

3. The inflator defined in claim 1, wherein said fluid includes reservoir means having a chamber containing fluid under pressure.

4. The inflator defined in claim 3, wherein said pressure chamber has an annular configuration.

5. The inflator defined in claim 4, wherein said outlet means includes means defining an outlet passage disposed centrally with respect to said annular chamber.

6. The inflator defined in claim 1 wherein said fluid directing means includes:
   a. means defining an outlet passage;
   b. means sealing said outlet passage; and
   c. means operable to disable said sealing means upon activation of said fluid source.

7. The inflator defined in claim 6, wherein said means disabling said sealing means is operable to move said diffuser member to the expanded position.

8. An inflator for a vehicle occupant restraint system of the type operable upon receipt of a vehicle collision signal and having a confinement expandable from a collapsed non-operative position to an expanded operative condition for restraining an occupant, said fluid supply comprising:
   a. reservoir means having a chamber containing fluid under pressure;
   b. means defining an outlet passage for said pressure chamber;
   c. means defining a second chamber, said means being disposed at least partially within said pressure chamber and including initially sealed means isolating said second chamber from said pressure chamber and said outlet passage;
   d. means sealing said outlet passage;
   e. fluid generating means disposed within said second chamber;
   f. means operable upon receipt of said collision signal to activate said fluid generating means, to disable said isolating means, and permit fluid flow in said outlet passage;
   g. diffuser means disposed over said outlet passage, said diffuser means including a member having a plurality of exit ports disposed about the periphery thereof, said member having a central portion of substantially planar configuration deformable, upon activation of said fluid generating means, from an initial generally flat position substantially restricting fluid flow to an open curved position permitting substantially less restricted fluid flow to said exit ports.

9. The fluid supply defined in claim 8, wherein:
   a. said reservoir means includes means defining an annular chamber;
   b. said means defining said second chamber is disposed centrally with respect to said annular chamber; and
   c. said means defining said outlet passage is disposed centrally with respect to said annular chamber and defines an outlet passage discharging in a direction axially with respect to said annular chamber.

10. The device defined in claim 9, wherein said means defining said outlet passage includes a member having a plurality of passages disposed such that said generated fluid is directed initially into said annular chamber for admixing with said pressurized fluid and then into said outlet passage.

11. The fluid supply defined in claim 9, wherein said means isolating said second chamber includes a member having frangible portions thereof initially sealing said second chamber from said pressure chamber, said member being movable, upon rupture of said frangible portion, to disable said passage sealing means.

12. The fluid supply defined in claim 11 wherein said sealing means includes a second member having frangible portions initially sealing said outlet passage, said second member being movable to deform said diffuser.

13. The device defined in claim 9, wherein:
   a. said fluid generating means includes solid propellant gas generating material; and,
   b. said means operable to activate said fluid generating material includes electroexplosive means.

14. The fluid supply defined in claim 8, wherein said reservoir means, said outlet passage defining means and said means defining said second chamber include a common tubular member.

15. The device defined in claim 14, wherein said tubular member defines a plurality of second passages such that the generated fluid flows first into said pressure chamber for admixing with said pressurized fluid and then into said outlet passage.

16. The device defined in claim 8, wherein said diffuser means includes a generally circular member having the outer periphery thereof attached to said reservoir means and having formed therein a plurality of circumferentially spaced radial flow exit ports.

17. An inflator for a vehicle occupant restraint system of the type having an expandable confinement inflated in response to a collision signal, said inflator comprising:
   a. a source of pressurized fluid including means defining an exit passage therefrom;
   b. means operable upon receipt of said collision signal to activate said fluid source and cause fluid to flow from said exit passage;
   c. means for directing fluid from said exit passage to said confinement including diffuser means disposed over said exit passage, said diffuser means including a deformable plate having a central portion of substantially planar configuration and having the outer periphery thereof secured to said passage defining means and said plate has a plurality of exit ports therein disposed adjacent the periphery thereof, said plate having a closed position with said central portion thereof initially contacting said passage defining means and said central portion having a deformed curved open position upon activation of said source such that said central portion is spaced from said passage defining means thereby permitting substantially unrestricted flow to said exit ports.

18. An inflator for inflating an expandable confinement for restraining a vehicle occupant in response to a collision signal, said inflator comprising:
   a. a source of pressurized fluid;
   b. means operable upon receipt of said collision signal to activate said fluid source and permit pressurized fluid to flow therefrom;
   c. outlet means for directing said fluid flow from said source including diffuser means having a deformable member having a central portion of initially substantially flat configuration with a cupped periphery having a plurality of exit ports disposed therein for directing fluid flow therefrom, said flat central portion being deformable in response to activation of said fluid source in the direction of the flow path from said source to move from an initial flat position substantially restricting fluid flow to a deformed open curved position permitting substantially less restricted fluid flow to said exit ports.

* * * * *